Reissued Mar. 9, 1943

Re. 22,284

UNITED STATES PATENT OFFICE 22,284

STERILIZATION PROCESS

Carroll L. Griffith and Lloyd A. Hall, Chicago, Ill., assignors to The Griffith Laboratories, Inc., Chicago, Ill., a corporation of Illinois No Drawing. Original No. 2,189,947, dated February 13, 1940, Serial No. 145,154, May 27, 1937. Application for reissue February 12, 1941, Serial No. 378,606

9 Claims. (Cl. 21—58)

The present invention relates to the sterilization of materials for the purpose of minimizing or annihilating the content of bacteria or their spores, or molds and yeasts, or their spores. It is applicable to a wide variety of materials including foods, ingredients of foods, dentifrices, drugs and medicines, medical supplies, such as bandages, dressings and sutures, cosmetic materials such as finished cosmetics like powders or ingredients entering into them, such as gums, minerals and the like.

Many substances which are subject to the process here described are used in compounding foods, such as breads, pastries, meats, beverages, sauces, etc. Such foods, or even the ingredients to be treated, are subject to spoilage, and often the spoilage is hastened by the quantity, or the type of organism that may be introduced by a certain ingredient. It has been uniformly supposed by most people that spices were antiseptic, but we have found some spices to contain both molds and bacteria, and frequently as many as 16,000,000 bacteria per gram. Natural vegetable matter is laden with organisms, or their eggs or spores, and where such matter is normally dried, or dehydrated, or processed in many usual ways, some organisms may exist in dormant form, such as spores. The dormant forms are thus ready for activation by proper environment, as when the dried matter is incorporated into moist foods. Natural spices such as cloves, cinnamon, coriander, ginger, paprika, nutmeg, allspice, sage, mace, etc., are one type of a food ingredient which is used in small amount, yet which is infested with spores, more particularly of molds, yeasts and bacteria. Cocoa, corn flour, wheat flour, soy bean flour, rice flour and other grain products represent a type of ingredient that is used in large amount in foods, introducing bacteria, yeasts and molds. Dried vegetables such as onion powder, garlic powder, asparagus powder, and others, are also guilty of contaminating foods. Dried fruits are also contemplated for treatment, such as raisins, prunes, peaches, apricots, figs, dates, raspberries, apples, etc. Materials such as meats of shell nuts and peanuts are also laden with organisms which can be eliminated by the present invention.

Materials such as gum tragacanth, gum acacia or arabic, gum karaya or India gum, agar agar, locust bean gum, Irish moss, gelatine, pectin, etc., are used in many fields, as for making gels or emulsions, and their efficiency or value depends upon their viscosity or gelling characteristics. It is desirable that these be rendered sterile as to some or all types of micro-organisms, and this may be done. Such materials may be treated by this invention under the same conditions as we apply to spices, but the elevated temperature of such cases causes a change in viscosity or gelling characteristics, such that much of the value or utility of the material is destroyed. We therefore find that changes in the details of the process can be made to preserve the desired characteristics, and yet to sterilize satisfactorily.

The invention concerns the use of ethylene oxide, and a preliminary treatment of the material to render the material receptive to the ethylene oxide. The insecticidal character of ethylene oxide is well known, and there are well established processes for using its insecticidal powers. These processes are inadequate to kill bacteria, yeasts and molds of the more resistant characters as is necessary to constitute a sterilization process.

In the insecticidal field the art has developed in a direction to limit or lessen the concentration of ethylene oxide employed to kill. Concentrations of from 1 lb. to 2.5 lbs. per 1000 cu. ft. are normal practice with atmospheric or vacuum processes. Because of the combustible character of ethylene oxide, its use as a pure gas has been retarded, and the art has developed a mixture of it with other gas. One common mixture has 1 part of ethylene oxide and 7.5 to 9 parts of carbon dioxide. It is recognized in the art that a less concentration of ethylene oxide is effective on insects where the carbon dioxide is present, the latter having a weakening effect on the insect. Such mixtures are about 10% to 12% ethylene oxide and so far as can be ascertained the concentration of such a mixture for fumigation seldom if ever exceeds 30 lbs. per 1000 cu. ft.

Experiments with a large number of materials have shown that very much higher concentrations of ethylene oxide are necessary for sterilizing processes; and that the material to be sterilized should be highly evacuated before contact with the ethylene oxide; that increased temperature aids in this preliminary treatment; and that the exposure to the ethylene oxide as to time and temperature may be varied according to temperature, material and degree of sterilization desired.

It is the object of the present invention to sterilize material by subjecting it to a high degree of vacuum at not too low a temperature, with or without simultaneous heating above normal temperatures of about 70° F. to 80° F. according to the material, and then exposing it to undiluted ethylene oxide at a vault concentration of not less than ¾ of a pound per 35 cu. ft., at a temperature not less than 70° F. to 80° F.

The process is subject to considerable variation in factors of vacuum, time and temperature, but limited to not less than a minimum of ¾ of a pound of undiluted ethylene oxide per 35 cu. ft. The variations are determined largely by the kind of material employed.

As a result of a large number of experiments it has been determined that ethylene oxide may be safely and efficiently used for sterilization by first subjecting material to vacuum, with or without heat above normal atmospheric temperatures. This apparently removes water or moisture and cleans the surfaces and interior of the substance of adsorbed, or absorbed, or natural gases or moisture, whereby the material is activated to take up the ethylene oxide and possibly to increase its concentration locally by the powers of adsorption. The spores of the organisms may act in this way so that a sufficiently high toxic concentration is locally produced in or on the spores. We believe that the preliminary heating of the food-stuff carries the spores of bacteria, yeast and molds through a short period of activation which is followed by conditions arresting development, thus to leave the spore in weaker condition, more dehydrated, and hence more vulnerable to a toxic gas.

The studies have further shown that there must be a sufficient applied concentration of ethylene oxide, and a sufficient time period of exposure, at an adequate temperature. These are three factors which must be coordinated to produce efficient results. One fixed condition of these factors may suffice for certain bacteria, and be deficient for other bacteria or for yeasts and molds, or vice versa. Likewise, one fixed condition of these factors may suffice for one kind of material, and be inadequate for another material.

It has also been an object of this invention to apply a process to goods in certain types of packages, as well as to bulk products. It has been found that by the action of vacuum, the process is highly effective on both bulk and packaged goods, assuring deep penetration of sterilizing gas into the material being treated.

*Gums and the like.*—In order to illustrate the infestation of commercial materials, the following table is given:

| Material | Bacteria per gram | Mold and yeast per gram |
|---|---|---|
| Gum tragacanth | 9,225 to 14,550 | 300 to 1,000 |
| Gum acacia | 2,413 to 5,000 | 500 to 1,000 |
| Gum karaya | 7,800 to 19,350 | 1,950 to 2,500 |

The present invention is applied to these gums by first reducing the materials to small sized units to facilitate access of gas to the material. The following ordinary commercial forms are already suitable for treatment: the shreds of agar agar, the ribbons or powder of gum tragacanth, the dried natural Irish moss, the powders of gum arabic, India gum, locust bean gum, sheets or powder or granules of gelatine. The material is placed in a retort and heated for an hour at from 110° F. to 115° F. Then a vacuum of from 27 to 28 inches is drawn to evacuate air, moisture, and other removable volatiles.

For every 35 cu. ft. of retort space 1 lb. of undiluted ethylene oxide is admitted to the retort which is sealed to hold the vacuum which still remains. The temperature is maintained at 110° F. to 115° F. for 2½ hours or longer. The process is then complete, showing 99.5% of bacteria killed, and 100% of mold and yeast killed. The gums retain their desired useful characteristics, especially their viscosity and gelling characteristics. As the temperature of the process is increased above 115° F., the materials in general begin to lose their viscosity and gelling properties and their water-absorbent capacity. In other words they are somewhat denatured.

The effect of the ethylene oxide is demonstrated by comparison with results of heating at 110° F. to 115° F. in a vacuum for overnight without the ethylene oxide. In such a case only approximately 44% of bacteria are killed and 69% of mold. Likewise, where the process is varied by cutting the ethylene oxide to one-half pound per 35 cu. ft. the kill of bacteria is unsatisfactory. The product tested for bacteria and yeasts and molds was too heavily infested to establish a count by the procedure established for the products of this invention.

*Dried fruits.*—Materials such as dried apricots, raisins, prunes and the like may be successfully treated. Bacteria in such materials are relatively low, but the mold count is normally quite high. These materials may be processed by the same conditions above described for gums. 100% sterilization has thus been effected. The best results are obtained by conditioning the fruit to add approximately 3% moisture before the vacuum heating. This no doubt aids in the activation process.

*Surgical supplies and the like.*—Material for bandages, dressings, gauze, sutures and the like have been treated. Ordinarily, such materials are treated in an autoclave at 155° C. for 5 hours. In the case of sutures particularly, the prolonged high heat may damage the material. Its strength is important as it must not break in use. By the present invention the temperature need not be above the normal boiling point of water.

The material is heated at 190° F. for two hours in a retort. Then a vacuum of 27 to 28 inches is drawn. Ethylene oxide (1 pound per 35 cu. ft.) is introduced and the temperature retained at 190° F. for 2½ to 3 hours. The longer time and higher temperature assures 100% sterilization, which is most important in this field.

*Cosmetics.*—Mineral ingredients for face powder are subject to sterilization by the present invention. But when such sterile materials are processed to produce face powders, rouge, etc., other ingredients are added and infestation may be thus or otherwise acquired. We have found that completely finished face powders and rouges, including perfumes, color, and emollient, may be treated by the present invention to assure a finished product relatively free from organisms which might infect a person using the product, or to which one might be allergic.

The face powder is placed in a retort at 110° F. to 115° F. for 2½ hours. Then a vacuum of 27 to 28 inches is drawn, and 1 lb. of ethylene oxide per 35 cu. ft. of retort space is admitted and exposure continued for 2½ hours. A sterile product has thus been obtained.

*Spices.*—Spices are particularly hard to sterilize because of resinous and oily ingredients therein. Dry or moist heat above 240° F. ruins the color and flavor of spices so as to make the same unmarketable—that is, the natural color chromogens are partially or wholly destroyed, and the essential or volatile oil flavoring constituents are partially or wholly dissipated. It has been determined that many food materials may be heated to 220° F. for a considerable length of time without damage, including spices. This temperature is not a sufficient sterilizing temperature, no matter how prolonged. Where the food material is practically dry, the organisms are dormant by nature to resist destruction by heat. There is a tendency of course to sterilize, and in the present invention this is supplemented by adding ethylene oxide in concentration to assure desired results. It has been determined that a sufficient concentration of ethylene oxide is required, of at least ¾ of a pound, but preferably 1 pound, to 35 cu. ft. of evacuated space. This concentration is used irrespective of how much material is in that space. In the case of spices the 35 cu. ft. may contain 800 pounds of spice, either in bulk or in packages or bags.

For spices the invention is therefore carried out at a higher temperature by the following procedure. The spice material is placed in a retort which is heated from 220° F. to 230° F. The spice contents need attain a temperature of only 190° F., but some may be at the temperature of the retort. The spice is heated from 190° F. to 230° F. for 1 hour. Then a vacuum of 27 to 28 inches is drawn. This effects a dehydration and release of moisture, air and gases, perhaps from adsorbed, absorbed or other physical union, and prepares or activates the material for gas treatment. In the case of packages, it evacuates them of air. Some stages of the heating may activate the spores, and the combined heating and evacuation may arrest them. When the vacuum is drawn the temperature of the material drops to about 150° F. When the ethylene oxide is admitted the vacuum may drop to a lower value, such as 18 inches to 24 inches, more or less depending upon the contents of the autoclave or retort. The contents are allowed to stand for 2½ hours. Then the vacuum is released, excess ethylene oxide withdrawn, and the material aerated. This may be done by passing air through the autoclave or by exposure. Both methods serve to cool the contents down to normal room temperatures. It is preferred to pass air through the autoclave or retort until analysis shows the absence of residual ethylene oxide. Filtered and/or sterilized air may be used, but this may be dispensed with if the air source is relatively clean.

The foregoing process permits using material in burlap or paper bags or in corrugated cartons. The following table illustrates the results with spices:

| Product | Count per gram | | | |
|---|---|---|---|---|
| | Bacteria | | Yeast and mold | |
| | Before | After | Before | After |
| Black pepper | 2,600,000 | 22,000 | 98 | 0 |
| Red pepper | 3,400,000 | 17,000 | 25 | 0 |
| Paprika | 670,000 | 30,650 | 200 | 0 |

This shows efficiencies of 99.15%, 99.5% and 95.4% for bacteria, and 100% for yeast and mold.

In another case the charge in an autoclave was:

1— 25 lb. bag ground red pepper.
1— 25 lb. bag ground black pepper hulls.
6—140 lb. bag whole black pepper.

The retort was heated at 220° F. for one hour while subjecting the contents to 18 inches of vacuum. Then a higher vacuum of 27 to 28 inches was drawn with cooling to a temperature of about 150° F. for the contents. Ethylene oxide was admitted in the amount of 1 lb. per 35 cu. ft. of retort space. The vacuum dropped from 27 inches to 18 inches on admitting the ethylene oxide. The exposure continued for 2½ hours. The results are as follows:

| Product | Count per gram | | | |
|---|---|---|---|---|
| | Bacteria | | Yeast and mold | |
| | Before | After | Before | After |
| Red pepper | 3,400,000 | 17,000 | 2,500 | 20 |
| Ground hulls | 6,400,000 | 5,000 | 310 | 0 |
| Black pepper | 2,600,000 | 22,000 | 90 | 0 |

In each instance the efficiency is over 99% for bacteria and for yeasts and molds.

With suitable aeration or cleansing by gas no ethylene oxide need be left in the products, regardless of how fine or coarse they are, or what oil content they have. There is no change in taste or odor, and practically no loss to be observed. The original characteristics are retained. The gluten in flour is not altered.

The use of ethylene oxide in unadulterated form has heretofore been avoided because of its volatile and combustile character, conducive to explosion when admixed with air. For this reason it has been used commercially as diluted with inert gas such as carbon dioxide. But it is not thus efficient as a sterilizing agent in the quantities used heretofore, although its efficiency as a fumigant is increased by the presence of carbon dioxide. In practical operation we use undiluted ethylene oxide in the desired quantity and hence do not normally destroy the vacuum in the retort. However, it is to be understood that we may use a higher quantity so that even a pressure greater than atmospheric pressure is created. Practically we do not do this, because of danger of leakage of the rotort in which event we would discharge a highly explosive gas to create a hazard. We prefer therefore to use less bulk of gas and retain a vacuum. Therefore we use undiluted ethylene oxide gas, and secure what may be an additional factor toward efficiency in this respect.

In the preferred practice of the present invention the ethylene oxide is not diluted, but is distended by use in vacuo, and it is highly efficient because of absence of diluting gases, and because of the prior activation process practiced on the material. We believe that the material treated by high vacuum is cleansed of removable substances, much as carbon is activated, so that it is given greater power of absorption or adsorption of sterilizing gas. We depend upon ethylene oxide to sterilize and believe that by excluding diluting gases, such as carbon dioxide we avoid preferential local concentration of such diluting gas, and if there is a concentration effect involved, it is compelled to be concentration of ethylene oxide. We believe therefore that we make more efficient use of ethylene oxide by avoiding the possibility that some material may preferentially absorb carbon dioxide or other diluting gas from an injection of mixed gas.

In the above described process we have mentioned using air to scrub the sterilizing gas from the chamber. We may use gas other than air, such as nitrogen or carbon dioxide, or such gas mixed with ethylene oxide. While the chamber contains our undiluted ethylene oxide gas we may introduce diluting gas so that we may discharge a non-explosive mixture. The subsequent introduction, we believe does not materially weaken the effect of any pure ethylene oxide which may be already concentrated by absorption or other forces on or in the material being treated. During the sterilizing period the cooling of the contents or the increase of pressure in the chamber by any means, such as introduction of additional gas as above described will no doubt increase the effective concentration of sterilizing gas in or on the material. Accordingly we do not consider the invention limited to or dependent upon the presence of vacuum in the chamber during the sterilizing period. The important use of vacuum is prior to use of ethylene oxide and followed by use of sufficient ethylene oxide to effect sterilization. Because there is a recognized absorption of gas by material, we are not able to specify the quantity other than in terms of the amount of gas per unit of chamber space.

While we have illustrated the process mostly by examples wherein the material is heated and then evacuated, it is to be understood that these steps may be combined, as described herein without departing from the process. The higher the temperature of the heating, the more a vacuum will remove volatile ingredients from the chamber.

The present application is a continuation in part of our prior application Serial No. 82,457, filed May 29, 1936, now Patent No. 2,107,697, issued February 8, 1938, wherein the process is first described. Other applications of the process have shown us that the temperature need not be so high as initially practiced, that vacuum and heat are not necessarily prolonged simultaneous steps, and that for a high degree of sterilization, the critical limit of concentration of ethylene oxide is about ¾ of a pound per 35 cu. ft., although we still prefer the higher concentration of 1 lb. per 35 cu. ft.

The evacuation functions to remove the air which is ordinarily contained in the material treated, so that the ethylene oxide may enter for its effective action.

In the following claims the process is set forth in terms commensurate with the scope of the invention hereinabove described and claimed.

Reference is made to our copening application Serial No. 238,081, filed October 31, 1938, as a continuation in part of the present application.

We claim:

1. The process of sterilizing normally dry colloid materials having useful viscosity and gelling characteristics and water absorbing capacity without substantial loss in these properties, which comprises subjecting the material to a heat of about 110° F. to 115° F. for at least an hour, subjecting the so heated material to evacuation in a closed chamber to attain a vacuum 27 to 28 inches whereby moisture and removable gas are taken from the heated material, admitting substantially undiluted ethylene oxide gas into the chamber containing the evacuated material, the quantity of ethylene oxide being at least ¾ of a pound of ethylene oxide per 35 cu. ft. of chamber volume, whereby vacuum still persists in said chamber, and exposing the material to said gas for at least two and one-half hours, whereby substantially all the micro-organic life in the material is killed.

2. The process of sterilizing normally dry material which comprises heating the material for at least on hour at a temperature not lower than 110° F., freeing the heated material of removable gases and moisture by applying a vacuum thereto, exposing the dry evacuated material at a heat of from 110° F. to 240° F. in a chamber to substantially undiluted ethylene oxide gas at a concentration of at least ¾ of a pound to 35 cu. ft. of chamber volume for at least two and one-half hours.

3. A process of sterilizing which comprises heating solid normally dry material to be sterilized for at least an hour at a temperature not below 110° F., evacuating the so heated material in a vacuum chamber by the application of a high vacuum whereby moisture and removable gases are taken from the material to render it and the surfaces thereof receptive of sterilizing gas, then subjecting the dry heated evacuated material for at least two and one-half hours to the action of substantially undiluted ethylene oxide gas at a concentration of not less than ¾ lb. of gas per 35 cu. ft. of chamber space.

4. A process of sterilizing solid normally dry material subject to being heated while dry up to 240° F. without destruction of the material, which comprises heating the material to be sterilized for at least an hour at a temperature from 110° F. to 240° F., evacuating the so heated material in a vacuum chamber by the application of a high vacuum whereby contained moisture and removable gases are taken from the material to render it and the surfaces thereof receptive of sterilizing gas, then subjecting the dry heated evacuated material for at least two and one-half hours to the action of substantially undiluted ethylene oxide gas at a concentration of not less than ¾ lb. of gas per 35 cu. ft. of chamber space.

5. The method of treating material infested with microorganisms for marked reduction in the microorganism content thereof, which comprises subjecting the dry material in a container space to a vacuum of approximately 27 to 28 inches of mercury, then lessening the vacuum by the introduction of substantially undiluted ethylene oxide at a usage concentration of ¾ lb. of ethylene oxide per 35 cu. ft. of container space, and maintaining the ethylene oxide in contact with the material for at least 2½ hours at a temperature of not below 70° F.

6. The method of treating a dry material infested with microorganisms for marked reduction in the microorganism content thereof, which comprises subjecting the material to a high vacuum in a closed chamber, lessening the high vacuum by the introduction of substantially undiluted ethylene oxide gas into the chamber in amount of at least ¾ lb. per 35 cu. ft. of chamber space, and maintaining the material in contact with the gas for at least 2½ hours at a temperature not below 70° F.

7. The method of treating a dry material infested with microorganisms for marked reduction in the microorganism content thereof, which comprises subjecting the material to a high vacuum in a closed chamber, introducing substantially undiluted ethylene oxide gas into the chamber in amount of at least ¾ lb. per 35 cu. ft. of chamber space, and maintaining the material in contact with the gas for at least 2½ hours at a temperature of not below 70° F.

8. The method of treating an organic material infested with microorganisms for marked reduction in the microorganism content thereof, which comprises subjecting the dry material to a high vacuum in a closed chamber, lessening the high vacuum by the introduction of substantially undiluted ethylene oxide gas into the chamber in amount of at least ¾ lb. per 35 cu. ft. of chamber space, and maintaining the ethylene oxide in contact with the material for at least 2½ hours at a temperature not below 70° F.

9. The method of treating an organic material infested with microorganisms for marked reduction in the microorganism content thereof, which comprises subjecting the dry material to a high vacuum in a closed chamber, introducing substantially undiluted ethylene oxide gas in quantity of at least ¾ lb. per 35 cu. ft. of chamber space, and maintaining the material in contact with the gas for at least 2½ hours at a temperature of not below 70° F.

CARROLL L. GRIFFITH.
LLOYD A. HALL.